United States Patent
Konno et al.

(10) Patent No.: US 8,213,717 B2
(45) Date of Patent: Jul. 3, 2012

(54) DOCUMENT PROCESSING APPARATUS, DOCUMENT PROCESSING METHOD, RECORDING MEDIUM AND DATA SIGNAL

(75) Inventors: Yuuya Konno, Kangawa (JP); Masahiro Kato, Kanagawa (JP); Katsuhiko Itonori, Kanagawa (JP); Etsuko Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1117 days.

(21) Appl. No.: 11/832,810

(22) Filed: Aug. 2, 2007

(65) Prior Publication Data

US 2008/0187221 A1 Aug. 7, 2008

(30) Foreign Application Priority Data

Feb. 7, 2007 (JP) ................................. 2007-027658

(51) Int. Cl.
*G06K 9/34* (2006.01)
(52) U.S. Cl. ........ 382/175; 382/137; 382/174; 382/176; 382/201
(58) Field of Classification Search .................. 382/175, 382/176, 177, 179
See application file for complete search history.

(56) References Cited

U.S. PATENT DOCUMENTS

| | | | | |
|---|---|---|---|---|
| 5,077,805 A | * | 12/1991 | Tan | ............................... 382/137 |
| 5,132,786 A | | 7/1992 | Ishiwata | |
| 5,228,100 A | * | 7/1993 | Takeda et al. | ................. 382/175 |
| 5,249,240 A | * | 9/1993 | Nakayama | .................... 382/159 |
| 5,579,407 A | * | 11/1996 | Murez | ............................ 382/164 |
| 5,619,592 A | * | 4/1997 | Bloomberg et al. | .......... 382/175 |
| 5,822,454 A | * | 10/1998 | Rangarajan | .................... 382/180 |
| 6,327,387 B1 | * | 12/2001 | Naoi et al. | ..................... 382/190 |
| 7,020,320 B2 | * | 3/2006 | Filatov | ........................... 382/137 |
| 2004/0268239 A1 | * | 12/2004 | Fujita | ............................ 715/513 |
| 2005/0086222 A1 | * | 4/2005 | Wang et al. | ....................... 707/5 |

FOREIGN PATENT DOCUMENTS

| | | |
|---|---|---|
| JP | 61013867 | 1/1986 |
| JP | 2224569 | 9/1990 |
| JP | 5151388 | 6/1993 |
| JP | 5233705 | 9/1993 |
| JP | 2004082473 | 3/2004 |

* cited by examiner

*Primary Examiner* — Claire X Wang
*Assistant Examiner* — Michael Vanchy, Jr.
(74) *Attorney, Agent, or Firm* — Gesmer Updegrove LLP

(57) ABSTRACT

A document processing apparatus includes a marking detection part that detects a marking written on the form from data read by a first reading part, an attribute name extraction part that extracts a character string described beforehand within or near a marking area of the detected marking as an attribute name, an attribute name detection part that detects the attribute name, extracted by the attribute name extraction part, stored in an attribute information memory and specifies the descriptive position of the detected attribute name from the data read by a second reading part that reads the form on which the attribute values are entered, and an attribute value extraction part that extracts the character string around the detection position of the attribute name detected from the read data, and registers the extracted character string as the attribute value of the attribute associated with the attribute name in the attribute information memory.

8 Claims, 5 Drawing Sheets

DATA ORGANIZATION EXAMPLE OF DOCUMENT INFORMATION

| SHEET NUMBER | ATTRIBUTE NAME | POSITIONAL INFORMATION | DATA TYPE | ATTRIBUTE VALUE |
|---|---|---|---|---|
| S1 | FIXED ASSETS NAME | (x1,y1),(x2,y2) | CHARACTER | abcde1234 |
| | FIXED ASSETS NUMBER | (x3,y3),(x4,y4) | NUMBER | 1234 |
| | PLACE OF INSTALLMENT | (x5,y5),(x6,y6) | CHARACTER | SYSTEM BUILDING 5F |
| S2 | | | | |

Fig. 3

| MONTH AND YEAR OF DRAFT | Month | Day | Year | DRAFT NUMBER | |
|---|---|---|---|---|---|
| FIXED ASSETS NAME | | | | | |
| FIXED ASSETS NUMBER | | | | | |
| QUAN-TITY | | PLACE OF INSTALLMENT | | | |
| MONTH AND YEAR OF ACQUISITION | Month | Year | | | |
| SERVICE LIFE | | | Years | | |
| | | | | | |

Fig. 4

| MONTH AND YEAR OF DRAFT | Month   Day   Year | DRAFT NUMBER | |
|---|---|---|---|
| 41 → FIXED ASSETS NAME | | | |
| 42 → FIXED ASSETS NUMBER | | | |
| QUAN-TITY | | PLACE OF INSTALLMENT | |
| MONTH AND YEAR OF ACQUISITION | Month   Year | | |
| SERVICE LIFE | | Years | |
| | 43 | | |

Fig. 5

| MONTH AND YEAR OF DRAFT | Month   Day   Year<br>4   10   2007 | DRAFT NUMBER | |
|---|---|---|---|
| 41 → FIXED ASSETS NAME | abcde1234 | | ← 44 |
| 42 → FIXED ASSETS NUMBER | 1234 | | ← 45 |
| QUAN-TITY   1 | PLACE OF INSTALLMENT | SYSTEM BUILDING 5F | ← 46 |
| MONTH AND YEAR OF ACQUISITION | Month   Year<br>4   2007 | | |
| SERVICE LIFE | 6 Years | | |
| | 43 | | |

Fig. 8

DOCUMENT PROCESSING APPARATUS, DOCUMENT PROCESSING METHOD, RECORDING MEDIUM AND DATA SIGNAL

CROSS-REFERENCE TO RELATED APPLICATIONS

This application is based on and claims priority under 35 USC 119 from Japanese Patent Application No. 2007-27658 filed Feb. 7, 2007.

BACKGROUND

1. Technical Field

The present invention relates to a document processing apparatus and method, and more particularly to automatically extracting entry items on a document form.

2. Related Art

It is efficient to acquire entry data from each of a large number of forms of uniform layout without taking much time. Conventionally, an entry portion of data to be read on the form was marked by designating the coordinates or using a marker, and entry data at the designated entry portion was acquired by performing character recognition with an OCR (Optical Character Reader) for read data of the form read by a scanner.

SUMMARY

According to an aspect of the present invention, there is provided a document processing apparatus including a first reading part that reads a form, a marking detection part that detects a marking written on the form from data read by the first reading part, an attribute name extraction part that extracts a character string described beforehand within or near a marking area of the detected marking as an attribute name, an attribute information memory that stores the attribute name extracted by the attribute name extraction part, a second reading part that reads the form on which the attribute values are entered, an attribute name detection part that detects the attribute name stored in the attribute information memory and specifies the descriptive position of the detected attribute name from the read data by the second reading part, and an attribute value extraction part that extracts the character string around the detection position of the attribute name detected by the attribute name detection part from the read data by the second reading part, and registers the extracted character string as the attribute value of the attribute associated with the attribute name in the attribute information memory.

BRIEF DESCRIPTION OF THE DRAWINGS

An exemplary embodiment of the present invention will be described in detail based on the following figures, wherein:

FIG. 3 is a view showing an organization example of data set and registered in an attribute value information memory in this exemplary embodiment;

FIG. 4 is a view partially showing a fixed form for use in this exemplary embodiment;

FIG. 5 is a view showing an example of a template created by marking the form as shown in FIG. 4;

FIG. 8 is a view showing the form after the attribute values are entered as shown in FIG. 4.

DETAILED DESCRIPTION

An exemplary embodiment of the present invention will be described below with reference to the drawings. In this exemplary embodiment, an image forming apparatus with a scanner as a document processing apparatus is exemplified.

Figure 1:
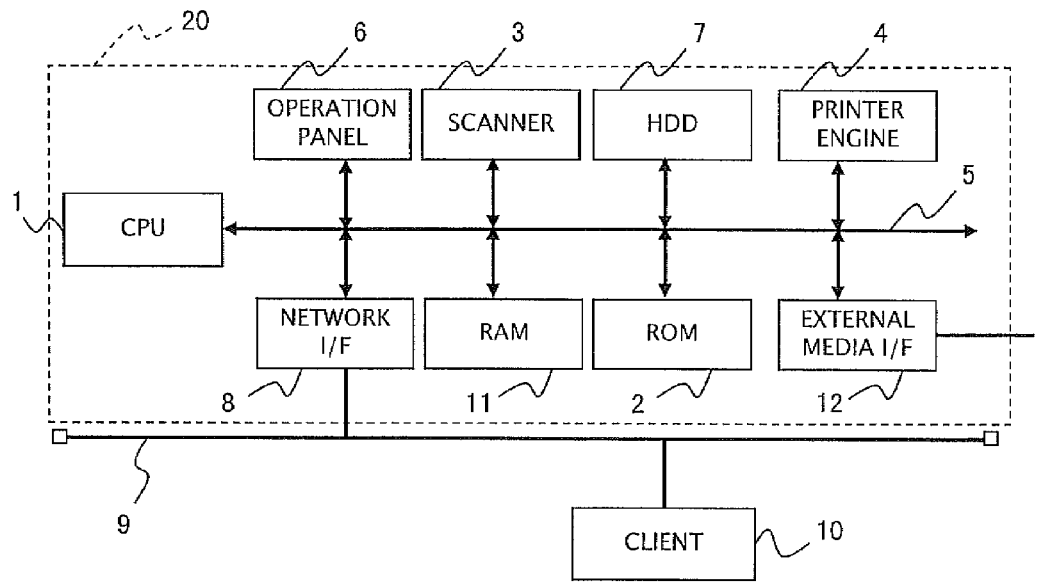
FIG. 1 is a hardware configuration diagram of an image forming apparatus with a document processing apparatus according to the exemplary embodiment.

FIG. 1 is a hardware configuration diagram of an image forming apparatus 20 in this exemplary embodiment. The image forming apparatus 20 is a multi-functional device having multiple functions including a scanner function and a copy function, and contains a computer. In FIG. 1, a CPU 1 controls the operation of multiple mechanisms mounted on the main apparatus such as a scanner 3 and a printer engine 4 in accordance with a program stored in a read-only memory (ROM) 2. An address data bus 5 connects multiple kinds of mechanisms that are the control object of the CPU 1 to allow the communication of data. An operation panel 6 accepts an instruction from the user and displays the information. A scanner 3 reads an original set by the user and accumulates electronic data in an HDD (Hard Disk Drive) 7 or the like. The HDD 7 stores an electronic document read using the scanner 3. A printer engine 4 prints an image on the output specifications form in accordance with an instruction from a control program executed by the CPU 1. A network interface (I/F) 8 connects a network 9 to allow data communication with another computer 10. A random access memory (RAM) 11 is used as a work memory in executing the program or a communication buffer in sending or receiving the electronic data. The ROM 2 stores various programs for controlling the apparatus, encrypting the electronic data and sending or receiving the electronic data. When various programs are executed, each part, described later, exhibits a predetermined processing function. An external media interface (I/F) 12 is the interface with an external memory device such as a USB memory or a flash memory.

Figure 2:
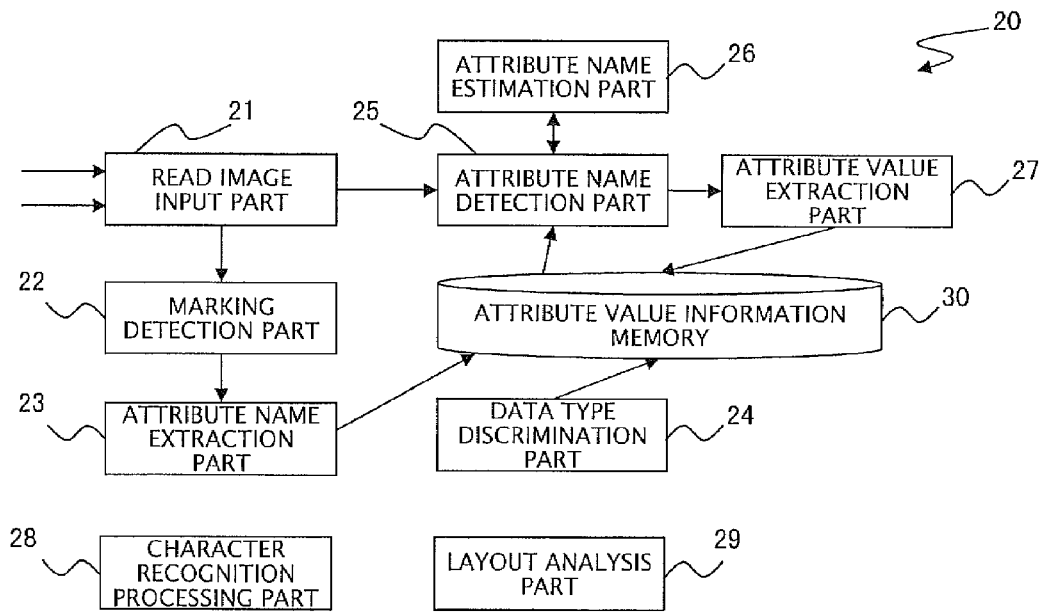
FIG. 2 is a block diagram of the image forming apparatus according to this exemplary embodiment.

FIG. 2 is a block diagram of the image forming apparatus according to this exemplary embodiment. In FIG. 2, each functional block is implemented by a computer mounted on the image forming apparatus 20 and need for describing this exemplary embodiment. In FIG. 2, a read image input part 21, a marking detection part 22, an attribute name extraction part 23, a data type discrimination part 24, an attribute name detection part 25, an attribute name estimation part 26, an attribute value extraction part 27, a character recognition processing part 28, a layout analysis part 29 and an attribute value information memory 30 are illustrated.

The read image input part 21 inputs the image data read by the scanner 3. In this exemplary embodiment, the form, marked with entry data not filled out, on which entry data is to be written in a preparatory process that is performed before the attribute values are acquired, and the form on which the attribute values are actually written in an attribute value acquisition process are read. The read image input part 21 is used in both the processes. The form read in the preparatory process is simply called a "template". Also, the term form includes the template, unless specifically noted. The marking detection part 22 detects the marking written on the template. Since the marking is made by a pen type marker in this exemplary embodiment, some area is formed depending on the pen width and marking length in the marking portion. The attribute name extraction part 23 extracts the character string described beforehand within or near the marking area as the attribute name, when marked on the template. The character string described beforehand means the name or the like representing the entry item that is preprinted on the form. In this exemplary embodiment, the character string in correspondence with the attribute value to be entered is particularly called an "attribute name". The attribute name extraction part 23 registers the acquired attribute name and the positional information specifying the descriptive position of the attribute name in the attribute value information memory 30. The data type discrimination part 24 discriminates the type of data to be entered by analyzing the attribute name extracted by the attribute name extraction part 23 and registers its result associated with the attribute name in the attribute value information memory 30.

The attribute name detection part 25 detects the attribute name stored in the attribute value information memory 30 and specifies the descriptive position of the detected attribute name from read data of the form on which the attribute values are actually entered. The attribute name estimation part 26 collates the character string extracted from the read data of the form on which the attribute values are actually entered and the attribute name stored in the attribute value information memory 30, and identifies the attribute name if it is judged that the meaning of the attribute name (character string) for comparison is identical. The attribute value extraction part 27 extracts the character string around the detection position of the attribute name detected by the attribute name detection part 25 from the read data of the form on which the attribute values are actually entered, and registers the extracted character string as the attribute value of the attribute associated with the attribute name in the attribute value information memory 30. The character recognition processing part 28 executes a character recognition process for read image data to extract the character string printed on the form. The layout analysis part 29 analyzes the layout of the template.

FIG. 3 is a view showing an organization example of data set and registered in the attribute value information memory 30 in this exemplary embodiment. The attribute name marked on the form is set and registered in correspondence with a sheet number that is identification information of the read form, and further the positional information specifying the detection position of each attribute name on the form and the data type and attribute value of the attribute are set and registered in correspondence with each attribute value, as shown in FIG. 3. The positional information is represented by the upper left and upper right coordinate values of a rectangle with which the character string representing the attribute name is fully surrounded. The reference coordinate (0,0) is at the upper left corner of the form. The data type is in the data format recognizable from the attribute name through the natural language process for a numeral and character string. The attribute value is entry data corresponding to the attribute name actually read from the form.

The parts 21 to 29 in the image forming apparatus 20 are realized by cooperation between the hardware resources such as the computer and the scanner 3 mounted on the image forming apparatus 20 and the program operating with the CPU 1 mounted on the computer. Also, the attribute value information memory 30 is realized by the HDD 7 or RAM 11.

Also, the program for use in this exemplary embodiment is of course delivered by a communication part, or provided by storing it in a computer readable recording medium such as a CD-ROM or DVD-ROM. The program delivered from the communication part or the recording medium is installed in the computer, and the CPU of the computer executes the installed program serially to implement various kinds of process.

FIG. 4 is a view partially showing a fixed form for use in this exemplary embodiment. The character strings (attribute names) to indicate the attribute items to be entered are preprinted on the form. For example, the "MONTH AND YEAR OF DRAFT" and "FIXED ASSETS NAME" correspond to the attribute names. An entry portion of the attribute value is provided adjacent to the attribute name, and an entry area is clearly specified by the frame. In this exemplary embodiment, there is a feature that the attribute name for the attribute value entered on the form is obtained from the character string described beforehand on the template. This is performed in the following manner.

That is, the user marks the attribute name indicating the entry portion of the attribute value of acquisition object on the fixed form on which the attribute value is not yet entered. A method for marking the attribute name may include circling it with a pen. In this exemplary embodiment, the attribute name is marked using a marker. FIG. 5 shows an example of the template created by marking the form as shown in FIG. 4. From FIG. 5, it is apparent that the user made the markings 41 to 43 at three portions of "FIXED ASSETS NAME", "FIXED ASSETS NUMBER" and "PLACE OF INSTALLMENT".

Figure 6:
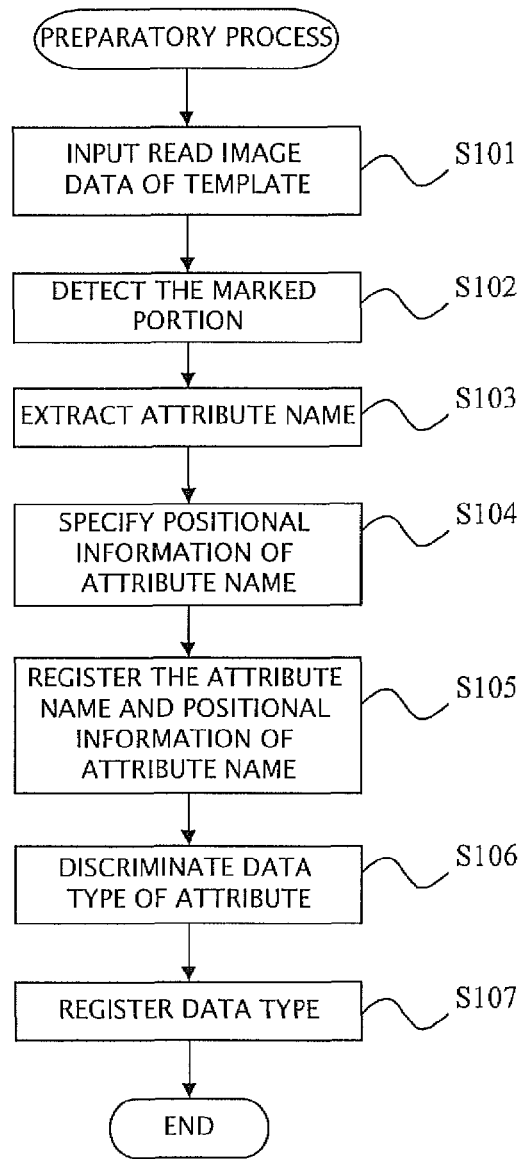
FIG. 6 is a flowchart showing a preparatory process that is performed before a process for acquiring the attribute value is performed in this exemplary embodiment.

The attribute name and the attribute value acquired from the form are specified by the user marking the attribute name of acquisition object. Referring to a flowchart of FIG. 6, a preparatory process that is performed before a process for acquiring the attribute value will be described below.

If the scanner 3 reads the template created by the user, the read image input part 21 inputs read image data from the scanner 3 (step 101). Though in this exemplary embodiment, the form is read by the scanner 3 mounted on the image forming apparatus 20, the read image data read and generated by an external reading device may be acquired via the network 9. The marking detection part 22 detects the marked portion from the template by performing the image processing for the read image data (step 102). Subsequently, the attribute name extraction part 23 extracts the character string from the image data of the character string portion printed at the marking position by enabling the character recognition processing part 28 to perform the character recognition process. This character string corresponds to the attribute name (step 103). Further, the attribute name extraction part 23 obtains the coordinate values at the upper left and lower right corners of the rectangle surrounding the extracted character string, and specifies the coordinate values as the positional information of the attribute name (step 104). Also, the attribute name extraction part 23 registers the attribute name and the positional information of the attribute name acquired in the above manner in the attribute value information memory 30 (step 105). Though the positional information is coordinate data of the rectangle surrounding the character string, the layout analysis part 29 may analyze the layout of the template to obtain the coordinate values at the upper left and lower right corners of a predetermined frame on which the attribute name is printed, if the attribute name is printed in the frame as shown in FIG. 5. Further, the data type discrimination part 24 discriminates the data type of the attribute by performing the natural language process for the attribute name extracted by the attribute name extraction part 23 (step 106), and registers its result associated with the attribute name in the attribute value information memory 30 (step 107).

In the above manner, at the preparation stage, the attribute value to be acquired from the form is selected and the attribute name to be given to the acquired attribute value is set.

By the way, the marking, which is made by hand using the marker, is not always written correctly on the character string that should be made the attribute name. Namely, there may be a case where the marking area is larger than the character string that is made the attribute name so that the entire character string to be designated as the attribute name and any other character string are marked, or a case where the marking area is smaller than the character string that is made the attribute name because the entire character string can not be marked. Such cases are dealt with in the following. That is, if the marker is used as in this exemplary embodiment, the marking area can be specified in accordance with the width of the pen point of the marker and the length of drawn line, whereby the attribute name extraction part 23 selects what is the marked character string according to the positional relation between the marking area and the character string or the content of the character string in the marking area. In principle, the character string contained at the largest ratio in the marking area becomes the character string to be marked. Also, if one character in a string can be selected, the entire character string to be extracted, namely, the attribute name, can be accurately extracted from a row of character in a string, even though the character string contains an unmarked portion. This is also the case where the marker is not used, for example, the attribute name is designated by drawing the slender line using the pen to form the closed area.

Referring now to a flowchart of FIG. 7, a process for acquiring the attribute values from each form on which the attribute values are actually entered, and registering them in the attribute value information memory 30 will be described below. In the following, it is assumed, for the sake of convenience, that the form from which the template is created and the form read in the process have the same layout.

If the user allows the scanner 3 to read the form on which the attribute values are entered, the read image input part 21 inputs the read image data from the scanner 3 (step 201). The read image data may be acquired via the network 9 as in the case of preparation. Herein, since it is presupposed that the template and the read form have the same layout, the attribute name matched with the registered attribute name should exist at the position specified from the positional information of the registered attribute name on the read form. Accordingly, the attribute value extraction part 27 does not need to perform the character recognition process for the entire read image data in this case, and can narrow the character recognition processing object area by referring to the positional information of the registered attribute name. Also, the attribute name detection part 25 performs the character recognition process for each narrowed area and extracts the character string included in each area (step 202). The character string matched with the registered attribute name is also extracted, namely, the attribute name is extracted from the read form, by comparing the attribute name registered in the attribute value information memory 30 (hereinafter "registered attribute name") and each extracted character string (step 203). The attribute value information memory 30 possibly registers the information concerning plural forms, which can be identified by the sheet number, but the user can specify the form by inputting and designating the sheet number. Alternatively, the form may be automatically discriminated by holding the layout analysis result of the template, and collating it with the layout of the form read at step 201 (hereinafter "read form").

Herein, since the character string matched with the registered attribute name exists among the character strings extracted from the read form (Y at step 204), the attribute value extraction part 27 then acquires the attribute value corresponding to the detected attribute name. Herein, before this process, the form on which the attribute values are entered will be described below.

FIG. 8 is a view partially showing the same fixed form as shown in FIG. 4 for use in this exemplary embodiment, and showing a state after the attribute values are entered in prescribed columns. As will be apparent from FIG. 8, the attribute values are entered in the prescribed columns. In the template as shown in FIG. 5, the markings 41 to 43 are written at three portions in this exemplary embodiment. Herein, taking notice of the attribute name "FIXED ASSETS NAME" that is the object of marking 41, the "FIXED ASSETS NAME" is horizontally written, whereby the entry column of the corresponding attribute value is generally provided on the right side or lower side of the print position of the "FIXED ASSETS NAME". In this exemplary embodiment, taking notice of such a feature dependent on the layout of the form, the corresponding attribute value can be detected more securely.

That is, the attribute value extraction part 27 detects the existent areas (columns) of the character strings existing around the attribute name detected from the read form (step 205). In an example of FIG. 8, the character areas including the character strings of "MONTH AND YEAR OF DRAFT", "FIXED ASSETS NUMBER" and "abcde1234" are detected from the periphery. Herein, the attribute value extraction part 27 selects the most valid character string as the attribute value of the attribute name by performing the natural language process for each character string included in each character string area and the attribute name (step 206). The attribute value extraction part 27 can more securely select the character string data "abcde1234" to be extracted as the attribute value by referring to the orientation of the attribute name (vertical writing or horizontal writing), a comparison in the layout between the template and the read form, or the data type of the required attribute value in this process. In FIG. 8, it is considered that "1234", "1", "SYSTEM BUILDING 5F" and "Month 10 Year 2007" that surround the attribute name print position can be extracted as the attribute value candidates for the "PLACE OF INSTALLMENT". However, for the "PLACE OF INSTALLMENT" that is written horizontally, the "SYSTEM BUILDING 5F" located on the right side and the "Month 10 Year 2007" located on the lower side can be selected as the attribute value candidates. Further, for the "PLACE OF INSTALLMENT", the "SYSTEM BUILDING 5F" including "5F", rather than including "month" and, "year" is more appropriate as the corresponding attribute value by performing the natural language process. Moreover, since the detection positions of the attribute values corresponding to other attributes "FIXED ASSETS NAME" and "FIXED ASSETS NUMBER" are located on the right side of the attribute names, it is easily considered that the attribute value corresponding to the "PLACE OF INSTALLMENT" is "abcde1234" located on its right side. In this manner, the attribute value corresponding to the marked attribute name can be easily specified from the character strings existing around the attribute name.

If the attribute value is extracted from the read form in this manner, the attribute value extraction part 27 registers the attribute value associated with the attribute value in the attribute value information memory 30 (step 207).

The above process is performed for each of the attribute names with the markings 41 to 43, whereby the attribute value corresponding to each attribute name can be automatically acquired more securely.

In the above description, for the sake of convenience, it is presupposed that the template and the read form on which the attribute values are entered have the same layout. The template is fundamentally created based on the form on which the attribute values are actually entered, and processed in the above manner. However, there is a possibility that it will not judged that the template and the read form have the same layout due to the reading precision of the scanner 3, dislocation of the form when read, or a difference in the resolution or device type. Also, the layout of the form may be slightly changed because of a review for the layout or increased entry items. Further, the attribute name printed on the form may be corrected after creation of the template in some cases. In such cases, the character string matched with the registered attribute name can not be obtained from the read form. Thus, such cases are adaptively handled in this exemplary embodiment. Such cases will be described below.

The attribute name detection part 25 extracts the character string described on the form by performing the character recognition process for the read image data on the read form.

Figure 7:
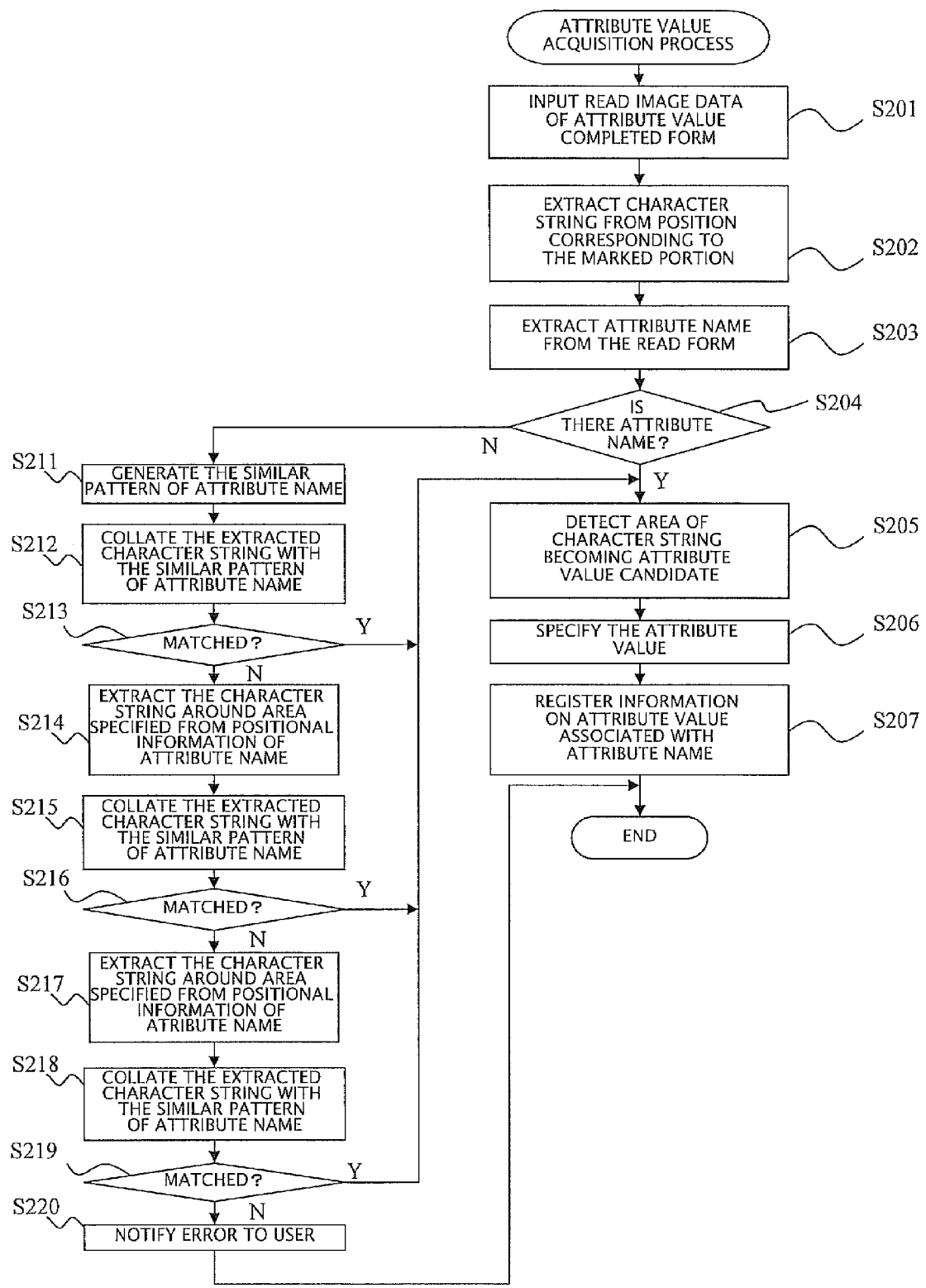
FIG. 7 is a flowchart showing an attribute value acquisition process in this exemplary embodiment.

In FIG. 7, if the character string matched with the registered attribute name does not exist among the character strings extracted from the read form (N at step 204), the attribute value extraction part 27 generates the character or character string liable to be mistaken as the registered attribute name as an attribute name variation pattern by performing the natural language process (step 211). For example, in the case of "FIXED ASSETS NAME", the attribute name variation pattern is the "NAME OF FIXED ASSETS". In this exemplary embodiment, the attribute name variation pattern is generated, when needed, but may be generated at the stage of the preparatory process for extracting the attribute name and registered in the attribute value information memory 30.

Herein, the character string extracted from the read form and the attribute name variation pattern generated instead of the registered attribute name are collated (step 212). If the character string matched with the attribute name variation pattern exists among the character strings extracted from the read form (Y at step 213), the applicable attribute name is detected from the read form, whereby the process following the step 205 is performed. This is effective in the case where the attribute name is changed owing to the revision of the form.

On the other hand, if the character string matched with the attribute name variation pattern does not exist among the character strings extracted from the read form (N at step 213), the character string existing near the area specified by the positional information of the registered attribute name on the read form is extracted (step 214). Namely, the extraction area of the character string on the read form is slightly expanded. In this manner, the character string extracted from the read form and the registered attribute name or the registered attribute name and attribute name variation pattern are collated (step 215). If the character string matched with the registered attribute name or the like exists among the character strings extracted from the read form (Y at step 216), the applicable attribute name is detected from the read form, whereby the process following the step 205 is performed. This is effective in the case where the entry column of the attribute name is moved slightly owing to the revision of the form.

On the other hand, if the character string matched with the registered attribute name or the like does not exist near the position on the read form corresponding to the descriptive position of the registered attribute name (N at step 216), the detection area of the attribute name is expanded from the neighborhood of the descriptive position of the registered attribute name over the entire read form to perform the same processing as step 214. At this time, the character string is extracted from the entire read form (step 217), and each extracted character string and the registered attribute name or the registered attribute name and attribute name variation pattern are collated (step 218). Also, if the character string matched with the registered attribute name or the like exists (Y at step 219), the applicable attribute name is detected from the read form, whereby the process following the step 205 is performed. This is effective in the case where the entry column of the attribute name is provided at a different position from the template because the form having a different layout from the form from which the template is created is read.

As a result of performing the above process, if the character string matched with the registered attribute name can not be finally detected from the read form (N at step 219), the user is given a notification (step 220).

This exemplary embodiment is largely divided into the preparatory process that is performed before the attribute values are acquired and the process for actually acquiring the attribute values from the form. While in this exemplary embodiment both processes are performed by one image forming apparatus 20 with the document processing apparatus, if the attribute value information memory 30 accessed in both processes can be shared, each process may be performed by a different document processing apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing apparatus comprising:
a first reading part that reads a form;
a marking detection part that detects a marking written on the form from data read by the first reading part;
an attribute name extraction part that extracts a character string described beforehand within or near a marking area of the detected marking as an attribute name;
an attribute information memory that stores the attribute name extracted by the attribute name extraction part;
a second reading part that reads a form on which attribute values are entered;
an attribute name detection part that detects the attribute name stored in the attribute information memory and specifies a descriptive position of the detected attribute name from data read by the second reading part; and
an attribute value extraction part that extracts a character string around the detection position of the attribute name detected by the attribute name detection part from the data read by the second reading part, and registers the extracted character string as the attribute value of an attribute associated with an attribute name in the attribute information memory, the attribute value extraction part selects the most valid character string as the attribute value by performing a selective natural language process for each character string included in each character string area and the attribute name, if the character string matched with the attribute name does not exist near the position on the read form corresponding to the descriptive position of the attribute name, the detection area of the attribute name is expanded from the area of the descriptive position of the attribute name over a selective region of the read form.

2. The document processing apparatus according to claim 1, further comprising a layout analysis part that analyzes a layout of the form from the data read by the first reading part, wherein the attribute name extraction part specifies a descriptive position of the character string to be extracted by collating the marketing area and the layout of the form.

3. The document processing apparatus according to claim 1, further comprising a discrimination part that discriminates the data type of the attribute by analyzing the attribute name extracted by the attribute name extraction part, wherein the attribute information memory stores the data type of the attribute value discriminated from the attribute name by the discrimination part associated with the attribute name, and the attribute value extraction part compares the data type specified by analyzing each extracted character string and the data type of the attribute value stored in the attribute information memory and extracts any character string with the matched data type from the plurality of extracted character strings as the attribute value of the attribute, if the plurality of character strings are extracted from around the detected position of the attribute name.

4. The document processing apparatus according to claim 1, wherein the attribute information memory stores the detection position of each attribute name associated with the attribute name, and the attribute value extraction part extracts any character string near the detection position of the attribute name as the attribute value of the attribute from the plurality of extracted character strings by referring to the detection position of each attribute name stored in the attribute information memory, if the plurality of character strings are extracted from around the detection position of the attribute name.

5. A document processing apparatus comprising:
a marking detection part that detects a marking written on a form from read data of the form;
an attribute name extraction part that extracts a character string described beforehand within or near a marking area of the detected marking on the form as an attribute name, the attribute value extraction part selects the most valid character string as the attribute value by performing a selective natural language process for each character string included in each character string area and the attribute name, if the character string matched with the attribute name does not exist near the position on the read form corresponding to the descriptive position of the attribute name, the detection area of the attribute name is expanded from the area of the descriptive position of the attribute name over a selective region of the read form; and
an attribute information memory that stores the attribute name extracted by the attribute name extraction part.

6. A document processing apparatus comprising:
an attribute information memory that stores an attribute name described beforehand within or near a marking area of a marking detected from read data of a form;
an attribute name detection part that detects the attribute name stored in the attribute information memory and specifies a descriptive position of the detected attribute name from the read data of the form on which attribute values are entered; and
an attribute value extraction part that extracts a character string around the detection position of the attribute name detected by the attribute name detection part from the read data, and registers the extracted character string as an attribute value of an attribute associated with the attribute name in the attribute information memory, the attribute value extraction part selects the most valid character string as the attribute value by performing a selective natural language process for each character string included in each character string area and the attribute name, if the character string matched with the attribute name does not exist near the position on the read form corresponding to the descriptive position of the attribute name, the detection area of the attribute name is expanded from the area of the descriptive position of the attribute name over a selective region of the read form.

7. A document processing method enabling a computer to perform a process comprising:
inputting read data of a form;
detecting a marking written on the form from the read data;
extracting a character string describe beforehand within or near a marking area of the detected marking as an attribute name;
storing the extracted attribute name in a memory;
inputting the read data of a form on which attribute values are entered;
detecting the attribute name stored in the memory and specifying a descriptive position of the detected attribute name from the read data of the form on which the attribute values are entered;
extracting the character string around the detection position of the detected attribute name from the read data of the form on which the attribute values are entered by selecting the most valid character string as the attribute value by performing a selective natural language process for each character string included in each character string area and the attribute name, if the character string matched with the attribute name does not exist near the position on the read form corresponding to the descriptive position of the attribute name, the detection area of the attribute name is expanded from the area of the descriptive position of the attribute name over a selective region of the read form; and
registering the extracted character string as an attribute value of an attribute associated with the attribute name in the memory.

8. A non-transitory recording medium storing a program causing a computer to perform a document processing method, the method comprising:
inputting the read data of a form;
detecting a marking written on the form from the read data;
extracting a character string described beforehand within or near a marking area o the detected marking as an attribute name;
storing the extracted attribute name in a memory;
inputting the read data of the form on which attribute values are entered;
detecting the attribute name stored in the memory and specifying a descriptive position of the detected attribute name from the read data of the form on which the attribute values are entered;
extracting the character string around the detection position of the detected attribute name from the read data of the form on which the attribute values are entered by selecting the most valid character string as the attribute value by performing a selective natural language process for each character string included in each character string area and the attribute name, if the character string matched with the attribute name does not exist near the position on the read form corresponding to the descriptive position of the attribute name, the detection area of the attribute name is expanded from the area of the descriptive position of the attribute name over a selective region of the read form; and
registering the extracted character string as the attribute value of the attribute associated with the attribute name in the memory.

* * * * *